(12) United States Patent
Gary

(10) Patent No.: US 6,868,437 B1
(45) Date of Patent: Mar. 15, 2005

(54) SYSTEM AND METHOD FOR INTERPROCESS COMMUNICATION OF REMOTE PROCEDURE CALL MESSAGES UTILIZING SHARED MEMORY

(75) Inventor: Robert M. Gary, Folsom, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 672 days.

(21) Appl. No.: 09/860,247

(22) Filed: May 18, 2001

(51) Int. Cl.[7] ............................................. G06F 15/167
(52) U.S. Cl. ...................................... 709/213; 711/148
(58) Field of Search ................................ 711/148, 153; 709/213, 214, 215; 710/52, 53

(56) References Cited

U.S. PATENT DOCUMENTS

| | | | |
|---|---|---|---|
| 6,023,732 A | * | 2/2000 | Moh et al. .................. 709/232 |
| 6,374,299 B1 | * | 4/2002 | Ford et al. .................. 709/227 |
| 2001/0049752 A1 | * | 12/2001 | Kays et al. .................. 709/330 |
| 2003/0061395 A1 | * | 3/2003 | Kingsbury et al. ......... 709/312 |
| 2003/0093585 A1 | * | 5/2003 | Allan ........................ 709/330 |

* cited by examiner

*Primary Examiner*—Hiep T. Nguyen

(57) ABSTRACT

The present invention is directed to a system and method which provide RPC communication services utilizing distributed shared memory. A process operating on a first client platform may write an RPC message into a shared memory segment that is also accessible by an RPC server. The process may notify the RPC server of the RPC message by setting a condition variable. A thread operating on the RPC server may remove the RPC message for distribution to another client. Similarly, RPC messages may be distributed to clients by writing the RPC messages into respective shared memory segments. Notification of outbound RPC messages may also be provided by respective condition variables.

26 Claims, 2 Drawing Sheets

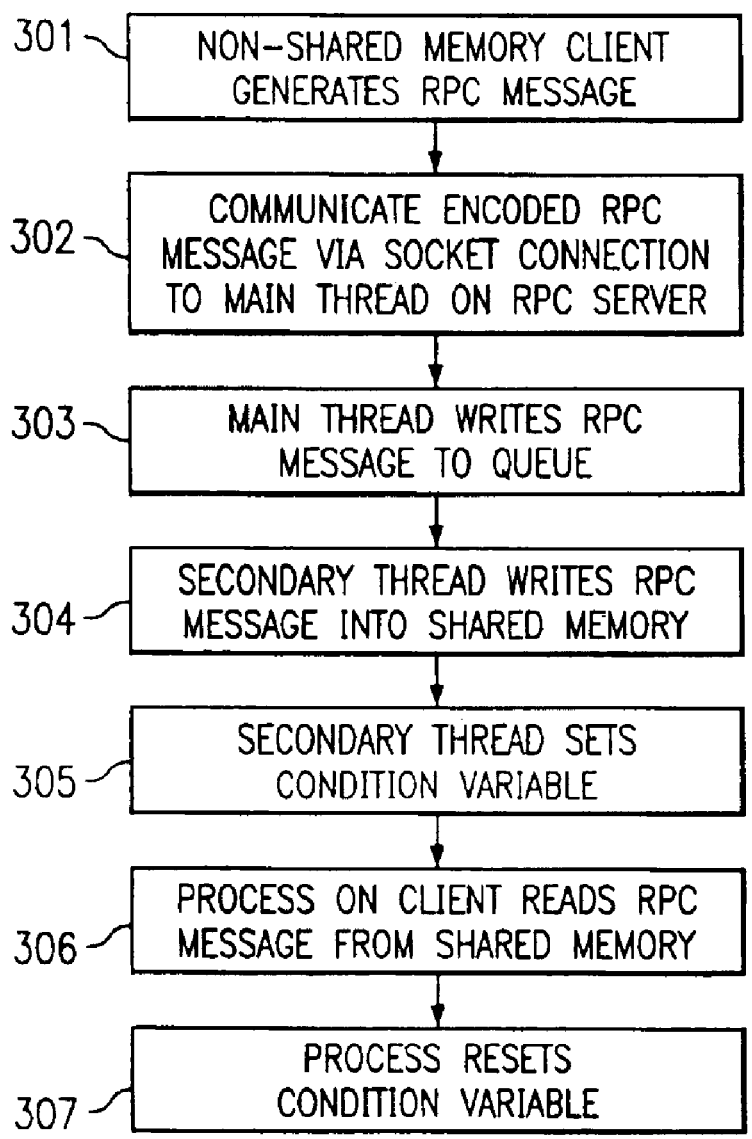

SYSTEM AND METHOD FOR INTERPROCESS COMMUNICATION OF REMOTE PROCEDURE CALL MESSAGES UTILIZING SHARED MEMORY

BACKGROUND

In recent times, distributed processing has become increasingly important within the field of data processing. To implement distributed applications and other programs, it is frequently useful to permit interprocess communication. Specifically, it is convenient to allow one process or program executing on one platform to be able to communicate with another process or program operating on a second platform. As an example, a database of information may be managed on one platform by a management process. Processes on other platforms may communicate with the management process to access or modify information contained in the database.

Various schemes or me or mechanisms have been implemented to address this desired functionality. Specifically, remote procedure call (RPC) systems have been developed to allow a program on one compute to execute a procedure on another computer. The first program may communicate various arguments pursuant to the RPC protocol for delivery to a process operating on the other computer. The second process will utilize the arguments to cause a particular task or tasks to be performed. Often, this involves constructing a return message for the first program containing results prompted by the initial arguments. Other object oriented approaches (such as CORBA and DCOM) have been created to facilitate similar interprocess communication.

RPC has typically been implemented utilizing an RPC server. The RPC server acts to receive messages from various clients for distribution to other clients. The RPC server does not perform any appreciable amount of processing upon the messages. Instead, the RPC server acts as a queuing agent before transporting messages to their destination where the requested procedure will be executed.

RPC servers have been implemented via a main thread associated with a particular socket on a server platform. In UNIX and some other operating systems, a socket is an operating system software object that connects an application to a network protocol. In UNIX for example, a process can send and receive TCP/IP messages by opening a socket and reading and writing data to and from the socket. A socket is advantageous for some applications, since a programmer need only worry about manipulating the socket and can rely on the operating system to actually transport messages across the network correctly.

To communicate a procedure call to another client in an RPC architecture, a process on the client would first communicate the procedure call to a main thread on the RPC server via a particular socket. The main thread would then place the procedure call in a queue. Eventually, the main thread would establish a socket connection to a given process on the destination client to communicate the procedure call. These steps necessarily involve a significant degree of latency. First, the main thread must be available before the originating process can perform the initial communication. Secondly, the initial communication is a synchronous process. Also, acknowledging the receipt of the procedure call by the main thread involves an amount of delay.

It is possible to create a multithreaded RPC server. However, a multithreaded RPC server does not provide significant performance gains unless the RPC server performs a significant amount of processing of messages. If the RPC server expends the majority of its processing capacity on communicating messages via sockets, the multithreaded approach will not produce any appreciable improvement. This effect is a result of operating system limitations. Specifically, operating system constraints limit operation of socket communication to a single thread at a time. Accordingly, multiple threads cannot communicate via sockets more efficiently than a single thread.

SUMMARY OF THE INVENTION

The present invention is directed to a system and method which provide RPC communication services utilizing distributed shared memory. Specifically, the present invention relates to facilitating interprocess communication and more specifically to interprocess communication between processes operating on different platforms. The communication may begin when a process operating on a first client generates an RPC message intended for a process operating on a second client. The first process may write an RPC message into a predetermined segment of distributed shared memory that is accessible by both the RPC server and the client. The first process may set a condition variable in the distributed shared memory to an appropriate state to notify a management thread in the RPC server that a message has been written.

The management thread in the RPC server will then process the RPC message for communication to the appropriate process operating on the second client. The management thread may place the RPC message into a queue for further processing. The RPC message may eventually be written into a second segment of distributed shared memory which is accessible by the RPC server and the second client. Alternatively, the RPC message may be communicated to the appropriate process via ordinary socket based communication protocols.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 3 depicts an exemplary flowchart detailing steps for communication of an RPC message to a client via shared memory according to a preferred embodiment of the present invention.

DETAILED DESCRIPTION

Figure 1:
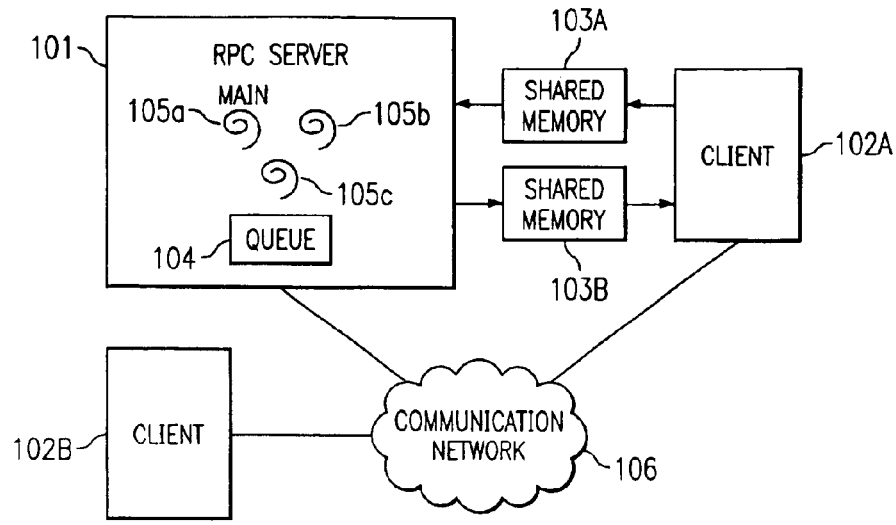
FIG. 1 depicts a block diagram of an exemplary system including an RPC server and clients implemented according to a preferred embodiment of the present invention.

Turning now to the drawing, FIG. 1 depicts a block diagram of an exemplary system 100 implemented according to a preferred embodiment of the present invention. It shall be appreciated that system 100 is represented at a relatively high level to simplify the discussion of the present invention. Specifically, an actual implementation may include any number of platforms, devices, communication interconnections, and/or the like. However, it shall be appreciated that system 100 is depicted with sufficient detail to allow one of ordinary skill in the art to make and use the present invention.

System 100 includes RPC server 101. RPC server 101 performs as an intermediary platform to dispatch messages received from clients to other clients. RPC server 101 may utilize any number of operating systems. In a preferred embodiment, RPC server 101 utilizes a UNIX operating system. RPC server 101 is preferably implemented as a multi-processor platform that is capable of executing any number of processes or threads simultaneously. In the example of FIG. 1, threads 105a, 105b, 105c operate on RPC server 101. The operations of threads 105a, 105b, 105c will be discussed in greater detail herein below. RPC server 101 further includes queue 104 which is utilized to queue RPC messages before message dispatch. Queue 104 may be implemented utilizing suitable memory (such as RAM or appropriate non-volatile storage media) for storing data (RPC messages) and suitable protocols for appropriately queueing such data.

System 100 further includes clients 102A and 102B. Clients 102A and 102B may utilize any number of operating systems. In a preferred embodiment, clients 102A and 102B utilize UNIX operating systems. Clients 102A and 1023 are preferably implemented as multi-processor platforms capable of executing any number of processes or threads simultaneously. However, clients 102A and 102B may alternatively be implemented as single processor platforms which utilize operating system protocols to share processing capacity between processes or threads.

System 100 further includes communication network 106 to which RPC server 101, client 102A, and client 102B are communicatively coupled. Communication network 106 is preferably implemented to support Internet Protocol (IP) routing. Communication network 106 may represent any number of implementations. As examples, communication network 106 may include a local area network (LAN), a wide area network (WAN), public switched telephony network (PSTN), wireless network, the Internet, an Intranet, and/or an Extranet. Most preferably, the Internet may serve as the interconnection mechanism to implement communication network 106. Communication network 106 may incorporate any combination of transport mechanisms including but not limited to Ethernet components, optical components, wireless data communication components, and/or the like.

System 100 further includes shared memory 103A and shared memory 103B. Shared memory 103A and shared memory 103B are preferably defined shared memory segments of a larger distributed shared memory scheme, since client 102A is preferably a distinct system which may be disposed at a distinct geographical location from the location of RPC server 101. A distributed shared memory scheme provides a view of logically shared memory over physically distributed memory. This allows an application programmer to treat a cluster of platforms as a uniform, large machine. This is in contrast to the network message passing approach, where one has to be aware that there are different machines and data must be explicitly sent across the nodes of the network. Shared memory 103A and shared memory 103B may be implemented utilizing either a page oriented approach or an object oriented approach as examples. Thus, shared memory 103A and shared memory 103B are generally accessible by both RPC server 101 and client 102A in the same way as the platforms access their own respective memories.

Figure 2:
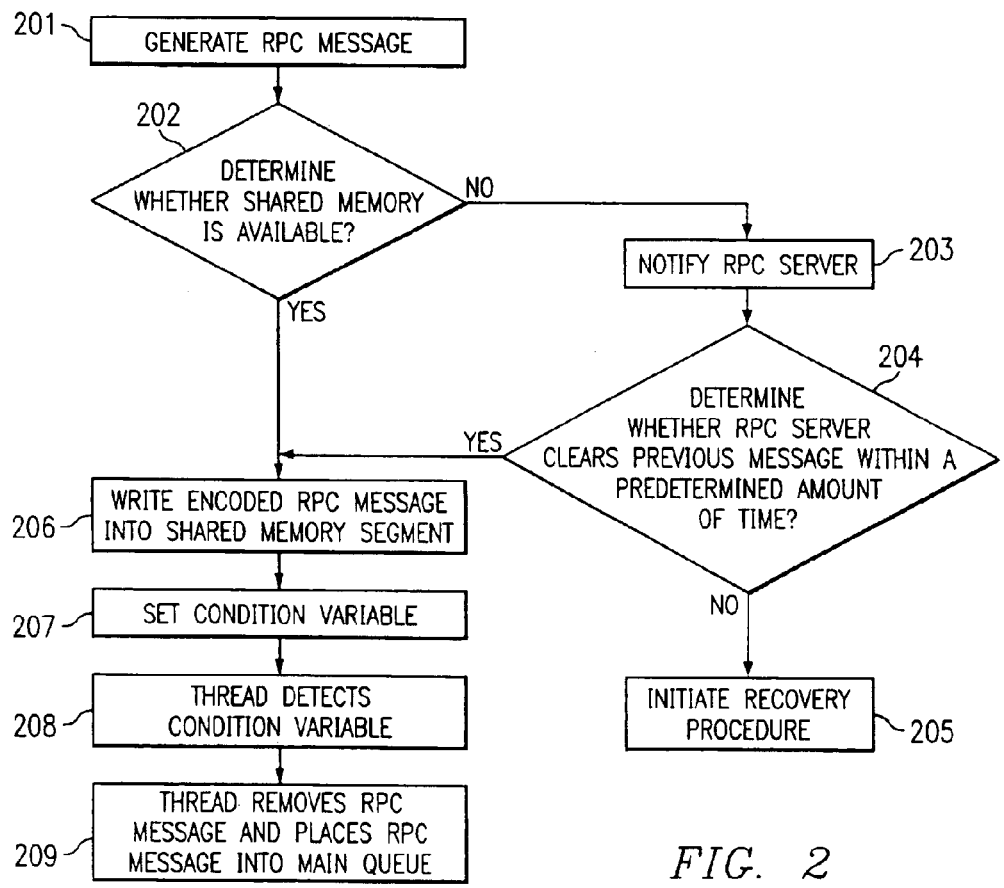
FIG. 2 depicts an exemplary flowchart detailing steps for communication of an RPC message from a client via snared memory according to a preferred embodiment of the present invention.

FIG. 2 depicts an exemplary flowchart detailing steps for communication of an RPC message from a client via shared memory according to a preferred embodiment of the present invention. Referring to the exemplary system of FIG. 1, when a process operating on client 102A creates an RPC message for a second process operating on client 102B (step 201), the process first determines whether space is available in shared memory 103A (step 202). For example, the process may determine the state of a condition variable associated with shared memory 103A to determine whether available space exists. A condition variable is a UNIX thread synchronization construct that allows a thread to block its own execution until some shared data reaches a particular state to control access to shared data. A condition variable allows threads to wait for that data to enter a defined state. The state is defined by a Boolean expression called a predicate. A predicate may be a Boolean variable in the shared data or the predicate may be indirectly determined by testing whether a counter has reached a certain value or whether a queue is empty.

If client 102A has previously written an RPC message to shared memory 103A and the previous message has not been removed, client 102A may attempt to notify RPC server 101 that a message is waiting (step 203). For example, client 102A may attempt to notify RPC server 101 via a socket connection over communication network 106. If the previous message is not removed within a predetermined amount of time (step 204), it may be assumed that RPC server 101 is dead and recovery procedures may be initiated (step 205).

When shared memory space is available, client 102A writes the RPC message into shared memory 103A (step 206). The RPC message may be intended to cause the second process operating on client 102B to execute a particular procedure. For example, the RPC message may include various arguments for the execution of the procedure. Also, a return message may be generated by the destination client 102B in response to the RPC message and its arguments.

It shall be appreciated that a RPC message typically cannot be simply constructed by writing any data object into a particular shared memory segment. Complex data objects frequently comprise pointers to memory locations of other data objects. If a pointer is written into a distributed shared memory segment, the other memory object will not generally be accessible. Specifically, the pointer refers to a data object that exists in ordinary memory instead of shared memory. Accordingly, the other platform (e.g., RPC server 101) typically cannot access the memory associated with the pointer and hence cannot utilize the data object.

This problem may be addressed by utilizing an encoding mechanism to flatten the RPC messages to thereby allow access to all of the data associated with the RPC message. For the purposes of the present invention, flatten means to represent a data object or data objects as a contiguous data representation. For example, External Data Representation Standard (XDR) may be utilized to perform this task. XDR defines a common communication scheme or encoding format that has been traditionally used to transfer data between different computer platforms. However in the present context, XDR may be utilized to encode RPC messages such that the RPC messages are represented as contiguous data objects that are fully accessible from shared memory segments. In addition, utilizing XDR as an encoding mechanism is advantageous since it may be utilized to encode RPC messages for communication by either distributed shared memory segments or for communication via socket based protocols. Significant portions of software code may be utilized by both socket clients and distributed shared memory clients.

After writing the message into shared memory 103A, the process operating on client 102A sets a condition variable that is maintained in shared memory to notify thread 105b that the message is ready to be dispatched (step 207). After setting the condition variable to an appropriate state, the process operating on client 102A may continue by performing other tasks. This provides greater availability to client 102A. Specifically, communication resources associated with client 102A are not unduly restricted while waiting for socket communication resources. Moreover, the process operating on client 102A may perform additional operations, since it is not subjected to the significant latency associated with socket based communication protocols.

Thread 105b detects that the condition variable has been set (step 208). Thread 105b then accesses shared memory 103A to retrieve the RPC message (step 209) for further processing and communication. In a preferred embodiment, thread 105b places the RPC message into queue 104. It shall be appreciated that the RPC message may be directly placed into a shared memory segment if the destination client is a shared memory client. However, one embodiment places all messages in queue 104 irrespective of whether the destination client is a shared memory client or not. The message may be addressed to multiple clients. There may also be a mix of TCP/IP and shared memory destinations for the message. After removing the message from shared memory 103A, thread 105b resets the condition variable to communicate that the memory may be reused for another message. Eventually, the RPC message is removed by main thread 105a from queue 104. Now, in this example, client 102B is not a shared memory client. Therefore, main thread 105a will subsequently utilize TCP/IP or UDP based socket communication to communicate the RPC message via communication network 106 to an appropriate process operating on client 102B. The process will subsequently cause the requested procedure associated with the RPC message to be performed. Also, the requested procedure may cause return data to be generated.

FIG. 3 depicts an exemplary flowchart detailing steps for communication of an RPC message to a client via shared memory according to a preferred embodiment of the present invention. When a process operating on client 102B creates an RPC message for a second process operating on client 102A (step 301), the process communicates the message via TCP/IP or UDP protocols to main thread 105a operating on RPC server 101 via communication network 106 (step 302). After receiving the RPC message, thread 105a writes the message to queue 104 (step 303). Thread 105c which is responsible for managing communication to client 102A through shared memory 103B removes the RPC message from queue 104 and writes the message into shared memory 103B (step 304). Thread 105c sets a condition variable to an appropriate state in shared memory to notify the appropriate process operating on client 102A of the arrival of the outbound (from the perspective of RPC server 101) message (step 305). Eventually, the process operating on client 102A reads the RPC message from memory (step 306) and resets the condition variable to signify that the memory may be reused (step 307). The process causes the appropriate procedure to be executed utilizing the various arguments as specified in the RPC message.

It shall be appreciated that the present invention does not require RPC messages to be dispatched to RPC server 101 via socket based protocols. However, it is contemplated that the present invention may be practiced in an environment where certain clients communicate RPC messages via shared memory and certain clients communicate RPC messages via traditional socket based protocols. Of course, it is possible to configure an actual implementation such that all RPC message communication occurs via shared memory. It shall further be appreciated that an actual implementation may contain significantly more clients than are represented in system 100. Additionally, a single RPC message need not be directed to a single client. Instead, a single RPC message may be dispatched to a number of clients in a substantially concurrent manner, where some of the clients may receive the RPC message via shared memory segments and other clients may receive the RPC message via communication network 106.

The preceding discussion has assumed that the shared memory is sufficiently large to contain an entire RPC message. However in actual practice, this assumption might not be valid. There are, of course, limitations to the size of shared memory segments. In fact, it is often preferred to limit the size of shared memory segments to optimize the performance of the shared memory scheme and related platforms. Accordingly, the present invention may be implemented to communicate via message fragmentation. Specifically, messages that are too large to be written in a particular shared memory segment are broken into smaller fragments and communicated in a successive manner. The fragments are then reassembled for further communication or processing.

In a preferred embodiment, RPC server 101 monitors the length of RPC messages to optimize the size of shared memory segments. RPC server 101 may calculate an average length of RPC messages over a predetermined time or for a predetermined number of messages. The averaging calculation may occur on a per segment basis. Alternatively, the averaging calculation may occur over all shared memory segments. RPC server 101 may reconfigure shared memory segments to ensure that a certain percentage of messages may be communicated through the respective shared memory segments without fragmentation. Alternatively, manual reconfiguration may occur utilizing the RPC messaging averages.

In a preferred embodiment, the present invention adapts the shared memory scheme to platform failure and recovery. For example, client 102A may malfunction for some reason, thereby requiring a recovery operation. During the recovery process, client 102A may register with RPC server 101 by establishing a traditional RPC connection. During the registration process, client 102A may communicate various identification information. Based upon the identification information, RPC server 101 will respond by communicating the location of the respective shared memory segments to allow client 102A to properly reattach to shared memory. After client 102A reattaches, messages that have been queued while client 102A was unavailable are remapped to be dispatched to client 102A. Accordingly, client recovery does not cause messages to be lost.

Context files are preferably implemented on RPC server 101 which will allow RPC server 101 to recover if RPC server becomes unavailable for some reason. Specifically, RPC server 101 will examine the contents of the context file for each client. The context files will provide information regarding whether particular clients are shared memory clients or not. Additionally, the context files preferably define the particular shared memory segments that are associated with specific clients. RPC server 101 will recreate the management threads and reattach to the shared memory segments. RPC server 101 will renegotiate the RPC connection for non-shared memory clients.

It shall be appreciated that the present invention provides significant advantages over known RPC applications that utilize socket based communication. Specifically, socket based communications that utilize TCP/IP protocols necessarily involve a degree of latency due to the synchronous nature of the communication. However, shared memory communication is by its very nature asynchronous. Thus, a process that writes to shared memory does not wait to receive confirmation that the data has been received. Instead, the process may proceed to perform other tasks.

Much of the perform gain comes from the fact that when a client writes a message to shared memory, the server can read the message while the client continues by performing other processing. When the client writes the next message, the shared memory should again be available and the client does not wait. Similarly, when a client processes a collected message, the server may concurrently place the next message into shared memory. Thus, when the client attempts to collect the next message, the message should already be written in the shared memory segment.

Secondly, socket based communications involve numerous limitations. For example, socket based communications require a significant amount of overhead signaling. Every time that a socket such as a TCP/IP connection is established, a significant amount of signaling and processing occurs solely for the purpose of establishing the connection. This occurs before any communication can occur. However, much less overhead is related to particular transactions in shared memory schemes.

Moreover, socket based communications are severely limited by operating system constraints. Specifically, a socket is an operating system software object that connects an application to a network protocol. Operating system constraints only allow a single socket object to be executed at any one time. Socket based applications do not achieve any significant benefit from parallel processing through multi threading. However, distributed shared memory systems do not suffer from these constraints, since the communication occurs in a manner that is similar to writing to local memory. Multithreading the RPC server does create significant processing efficiency in an environment that utilizes a distributed shared memory scheme. Thus, communication of RPC messages via shared memory segments significantly reduces the amount of time processes wait to communicate the messages to an RPC server. Specifically, the communication does not have to wait until the RPC server completes communications with another process associated with a different client. Additionally, shared memory communication allows other applications operating on the clients to operate more efficiently by allowing additional access to limited socket communication resources.

It shall be appreciated that the present invention allows substantial performance gains for RPC systems without requiring complete re-engineering of the RPC systems. Specifically, the present shared memory scheme is transparent to the application layer and thus transparent to the application developer. In particular, it is important to realize that TCP/IP data streams associated with ordinary RPC systems do not place constraints upon the length of the message. Thus, TCP/IP data streams are well suited to variable length RPC messages. On the other hand, shared memory segments inherently are limited in size. However, the present invention through message fragmentation makes this fundamental operating principle between TCP/IP data steams and shared memory segments completely transparent to the application developer.

It further shall be appreciated that the advantages of utilizing shared memory to communicate RPC messages are not dependent upon the capabilities of the destination client. A destination client that requires RPC messages to be communicated via socket based protocols does constrain operations of a shared memory client. Specifically, a shared memory client is provided greater availability by sharing memory segments with the RPC server. The RPC server then communicates the message via socket protocols to the non-shared memory client, thereby allowing the shared memory client to perform other tasks.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for intermediating remote procedure call (RPC) messages, comprising:

at least one inbound shared memory segment associated with a shared memory client for receiving inbound RPC messages from said shared memory client; and at least one outbound shared memory segment associated with said shared memory client for distributing outbound RPC messages to said shared memory client.

2. The system of claim 1 further comprising:

an inbound management thread associated with said inbound shared memory segment.

3. The system of claim 2 wherein said inbound management thread removes RPC messages from said inbound shared memory segment after receiving notification of arrival of inbound messages.

4. The system of claim 3 wherein notification occurs via a condition variable.

5. The system of claim 1 further comprising:
code for assembling RPC message fragments.

6. The system of claim 5 further comprising:
code for monitoring RPC message fragment statistics to determine an optimal size of a shared memory segment.

7. The system of claim 6, further comprising an outbound management thread to notify said shared outbound memory segment of arrival of said outbound RPC messages.

8. The system of claim 7, wherein said outbound management thread notifies said shared memory segment of arrival of said outbound RPC message via a condition variable.

9. A method for performing interprocess communication between distinct platforms, comprising:
generating an interprocess message at a first platform by a first process, wherein said interprocess message is operable to cause execution of desired code on a second platform;
writing said interprocess message into a shared memory segment, wherein said shared memory is accessible by at least first platform and an interprocess message server; and
communicating said interprocess message to a second process on said second platform.

10. The method of claim 9 wherein said writing step includes the sub-step of:
setting a condition variable associated with said shared memory segment.

11. The method of claim 9 wherein said writing step includes the sub-steps of:
fragmenting said interprocess message to generate a series of message fragments; and
writing said interprocess message into shared memory by successively utilizing said message fragments.

12. The method of claim 11 further comprising the step of:
monitoring fragment statistics to determine an optimal size of said shared memory segment.

13. The method of claim 9 further comprising:
removing said interprocess message from said shared memory segment, wherein said removing step waits to remove said interprocess message until a conditional variable associated with said shared memory segment changes states.

14. The method of claim 13 wherein said step of removing includes the sub-step of:
placing said interprocess message into a main queue of said interprocess message server.

15. The method of claim 9 wherein said step of communicating includes the sub-steps of:
determining whether said second platform is a shared memory platform;
when said second platform is a shared memory platform, writing said inteprocess message into a second shared memory segment associated with said second platform; and
when said second platform is not a shared memory platform, communicating said interprocess message to said second platform via a socket connection.

16. A computer readable medium having a computer program thereon for facilitating interprocess communication between a first process operating on a first platform and a second process operating on a second platform, said computer program comprising:
code for initializing a shared memory segment, wherein said shared memory segment is accessible by said first platform and an interprocess message server, and wherein said interprocess message server is operable to communicate interprocess messages placed in said shared memory segment to said second platform; and
code for writing an interprocess message into said shared memory segment, wherein said interprocess message is operable to cause execution of a procedure on said second platform.

17. The computer readable medium of claim 16 wherein said code for writing includes:
code for flattening said interprocess message.

18. The computer readable medium of claim 16 wherein said code for writing includes:
code for determining whether said interprocess message is larger than said shared memory segment; and
code for fragmenting said interprocess message when said inteprocess message is larger than said shared memory segment.

19. The computer readable medium of claim 16 wherein said code for writing includes:
code for detecting a state of a condition variable associated with said shared memory segment, wherein said condition variable reflects whether said shared memory segment is accessible.

20. The computer readable medium of claim 19 wherein said code for writing said includes:
code for setting said condition variable to indicate that said interprocess message is waiting to be delivered to said second process on said second platform.

21. A system for intermediating remote procedure call (RPC) messages, comprising:
a shared memory segment wherein said shared memory segment is accessible by said system and a shared memory client;
means for monitoring said shared memory segment for an incoming RPC message from said shared memory client; and
means for communicating said RPC message to at least one RPC client to thereby cause said at least one RPC client to execute a desired procedure.

22. The system of claim 21, wherein said means for monitoring monitors states of a condition variable associated with said shared memory segment.

23. The system of claim 21 further comprising:
means for reassembling a fragmented RPC message.

24. The system of claim 23 further comprising:
means for monitoring average RPC message lengths.

25. The system of claim 24 further comprising:
means for reconfiguring the size of said shared memory segment utilizing said monitored average RPC message length.

26. A remote procedure call (RPC) system comprising:
a shared memory client;
an RPC server;
a non-shared memory client;
a shared memory segment accessible by said shared memory client and said RPC server;
said shared memory client being operable to generate an RPC message to cause said non-shared memory to execute a desired procedure; said shared memory client being operable to flatten said RPC message; said shared memory client being operable to verify that said shared memory segment is accessible by examining a condition variable associated with said shared memory segment; said shared memory client being operable to fragment said RPC message when the length of said RPC message exceeds the size of said shared memory segment; said shared memory client being operable to communicate said RPC message to said RPC server utilizing said shared memory segment;

said RPC server being operable to detect that RPC information has been written in said shared memory segment by examining said condition variable; said RPC server being operable to remove said RPC information from said shared memory segment; said RPC server being operable to reassemble said RPC message when said RPC message has been fragmented; said RPC server being operable to communicate said RPC message to said non-shared memory client via a socket connection; said RPC server being operable to calculate length statistics of RPC messages; and said RPC server being operable to reconfigure said shared memory segment utilizing said calculated length statistics; and said non-shared memory client being operable to execute said desired procedure in response to receiving communication of said RPC message.

* * * * *